(12) United States Patent
Guo et al.

(10) Patent No.: US 12,288,165 B2
(45) Date of Patent: Apr. 29, 2025

(54) NATURAL LANGUAGE PROCESSING METHOD AND APPARATUS, DEVICE, AND READABLE STORAGE MEDIUM

(71) Applicant: SUZHOU METABRAIN INTELLIGENT TECHNOLOGY CO., LTD., Jiangsu (CN)

(72) Inventors: Zhenhua Guo, Jiangsu (CN); Li Wang, Jiangsu (CN); Yaqian Zhao, Jiangsu (CN); Rengang Li, Jiangsu (CN); Baoyu Fan, Jiangsu (CN); Xiangyi Deng, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/699,231

(22) PCT Filed: Jun. 30, 2022

(86) PCT No.: PCT/CN2022/102856
§ 371 (c)(1),
(2) Date: Apr. 5, 2024

(87) PCT Pub. No.: WO2023/130687
PCT Pub. Date: Jul. 13, 2023

(65) Prior Publication Data
US 2024/0330711 A1    Oct. 3, 2024

(30) Foreign Application Priority Data
Jan. 5, 2022 (CN) ......................... 202210003234.6

(51) Int. Cl.
*G06N 3/0499* (2023.01)
*G06N 5/02* (2023.01)
*G10L 15/22* (2006.01)

(52) U.S. Cl.
CPC ....................................... *G06N 5/02* (2013.01)

(58) Field of Classification Search
None
See application file for complete search history.

(56) References Cited

U.S. PATENT DOCUMENTS

| | | | |
|---|---|---|---|
| 11,557,310 B2* | 1/2023 | Binder | .................... G10L 15/22 |
| 12,014,118 B2* | 6/2024 | Gruber | ................ G06F 3/04817 |

(Continued)

FOREIGN PATENT DOCUMENTS

| | | |
|---|---|---|
| CN | 111581229 A | 8/2020 |
| CN | 111813802 A | 10/2020 |

(Continued)

OTHER PUBLICATIONS

Corresponding International Patent Application No. PCT/CN2022/102856, International Search Report, Date Mailed Sep. 29, 2022.

(Continued)

*Primary Examiner* — Seong-Ah A Shin
(74) *Attorney, Agent, or Firm* — Cooper Legal Group, LLC (57) ABSTRACT

Embodiments of the present application disclose a natural language processing method and apparatus, a device, and a readable storage medium. The method includes: obtaining a target sentence to be processed, and determining each first entity in the target sentence; for each first entity, in response to the first entity being present in a preset entity set, determining, in the preset entity set, a second entity in maximum correlation with the first entity, generating extended information based on the determined second entity, and adding the extended information after a location of the first entity in the target sentence, to obtain an updated target sentence, where the second entity is any entity in the preset entity set other than the first entity; and inputting the updated (Continued)

target sentence to a bidirectional encoder representations from transformer (BERT) model, such that the BERT model performs a natural language processing task.

15 Claims, 4 Drawing Sheets

(56) References Cited

U.S. PATENT DOCUMENTS

| | | | | |
|---|---|---|---|---|
| 12,050,983 | B2* | 7/2024 | Chowdhery | G06N 3/0499 |
| 2013/0275164 | A1* | 10/2013 | Gruber | G06F 16/2457 |
| | | | | 705/5 |
| 2019/0384814 | A1 | 12/2019 | McGoldrick | |
| 2021/0157975 | A1* | 5/2021 | Gelosi | G06F 40/166 |
| 2021/0174204 | A1* | 6/2021 | Yin | G06N 3/08 |
| 2022/0019740 | A1* | 1/2022 | Meyerzon | G06F 16/313 |
| 2022/0051080 | A1* | 2/2022 | Hajarnis | G06N 3/08 |

FOREIGN PATENT DOCUMENTS

| | | |
|---|---|---|
| CN | 113158665 A | 7/2021 |
| CN | 113779185 A | 12/2021 |
| CN | 113779211 A | 12/2021 |
| CN | 114021573 A | 2/2022 |
| WO | 2021169745 A1 | 9/2021 |

OTHER PUBLICATIONS

Corresponding International Patent Application No. PCT/CN2022/102856, Written Opinion, Date Mailed Sep. 29, 2022.
Corresponding Chinese Patent Application No. CN202210003234.6, First Office Action dated Feb. 16, 2022.
Corresponding Chinese Patent Application No. CN202210003234.6, Notification to Grant Patent Right for Invention, dated Mar. 5, 2022.
Chaochao Jia, "Research On the Method of Solving Multiple Choice Questions of Reading Comprehension Based on Keyword Semantic Expansion", China Master Dissertations Full-text Database (Digital Journal), Dec. 15, 2021, 57 pages with English abstract.

* cited by examiner

NATURAL LANGUAGE PROCESSING METHOD AND APPARATUS, DEVICE, AND READABLE STORAGE MEDIUM

CROSS-REFERENCE TO RELATED APPLICATIONS

This application is the national phase application of International Application No. PCT/CN2022/102856, filed Jun. 30, 2022, which claims priority to Chinese Patent Application No. CN202210003234.6, filed to the China National Intellectual Property Administration on Jan. 5, 2022 and entitled "NATURAL LANGUAGE PROCESSING METHOD AND APPARATUS, DEVICE, AND READABLE STORAGE MEDIUM". The contents of International Application No. PCT/CN2022/102856 and Chinese Patent Application No. CN202210003234.6 are incorporated herein by reference in their entireties.

FIELD

The present application relates to the field of computer machine learning technologies, and in particular, to a natural language processing method and apparatus, a device, and a readable storage medium.

BACKGROUND

Currently, a natural language processing task is generally performed through a bidirectional encoder representations from transformer (BERT) model. To improve task processing accuracy, additional knowledge is obtained from a knowledge graph, and then the additional knowledge is added to input data of the model, to assist the BERT model in the natural language processing task. The knowledge graph stores structural information, and thus is a best source for knowledge extraction.

However, an existing knowledge graph focuses on only a surface relation of a text, but ignores a potential relation that may exist. In addition, adding the information in the knowledge graph to an input of the BERT model is likely to bring excessive noise (low-relevance information), affecting efficiency and effects. Because the input of the BERT model determines accuracy of an output result of the BERT model, excessive noise in the information input to the BERT model not only increases an input data amount, but also may affect accuracy of the BERT model and reduce processing efficiency and processing effects of the BERT model, which makes the model impossible to accurately output a corresponding result. For example, in a question answering task, the BERT model cannot accurately answer a question.

SUMMARY

According to a first aspect, an embodiment of the present application provides a natural language processing method, including:
  obtaining a target sentence to be processed, and determining each first entity in the target sentence;
  for each first entity, in response to the first entity being present in a preset entity set, determining, in the preset entity set, a second entity in maximum correlation with the first entity, generating extended information based on the determined second entity, and adding the extended information after a location of the first entity in the target sentence, to obtain an updated target sentence, where the second entity is any entity in the preset entity set other than the first entity; and
  inputting the updated target sentence to a BERT model, such that the BERT model performs a natural language processing task.

In some embodiments, the determining, in the preset entity set, a second entity in maximum correlation with the first entity includes:
  using the first entity as a target object, and determining a maximum relation probability value of the target object relative to each second entity, to obtain N−1 pieces of maximum relation probability values, where N−1 represents a quantity of second entities, and N represents a total quantity of entities comprised in the preset entity set;
  determining a correlation between each second entity and the target sentence, to obtain N−1 pieces of correlations;
  for each second entity, calculating a product of the correlation corresponding to the second entity and the maximum relation probability value corresponding to the second entity, to obtain a correlation score corresponding to the second entity to obtain N−1 pieces of correlation scores; and
  taking a second entity corresponding to a maximum correlation score of the N−1 pieces of correlation scores as the second entity in maximum correlation with the target object.

In some embodiments, the determining a maximum relation probability value of the target object relative to each second entity includes:
  generating an N×N×M-dimensional tensor for representing a relation and a relation probability value between entities in the preset entity set, where M represents a quantity of dimensions of a relation vector between different entities in the preset entity set; and
  generating a knowledge graph based on the N×N×M-dimensional tensor, and querying, in the knowledge graph, the maximum relation probability value of the target object relative to each second entity.

In some embodiments, the generating an N×N×M-dimensional tensor for representing a relation and a relation probability value between entities in the preset entity set includes:
  generating an initial tensor that is all-0 in N×N×M dimensions;
  obtaining a sentence library for generating the preset entity set, traversing each sentence in the sentence library, and using the traversed sentence as a sentence to be recognized;
  using two adjacent entities in the sentence to be recognized as an entity group, to obtain a plurality of entity groups;
  recognizing a relation between two entities in each entity group by using a relation recognition model, to obtain a plurality of M-dimensional relation vectors;
  for each M-dimensional relation vector, in response to a maximum value in any M-dimensional relation vector being greater than a preset threshold, updating an element at a location that corresponds to the maximum value and that is in the initial tensor from 0 to 1, to update the initial tensor; and
  traversing a next sentence in the sentence library, continuing to update a current tensor, and after each sentence in the sentence library is traversed, outputting and optimizing a currently obtained tensor to obtain the N×N×M-dimensional tensor.

In some embodiments, the recognizing a relation between two entities in each entity group by using a relation recognition model, to obtain a plurality of M-dimensional relation vectors includes:

for two entities in any entity group, replacing the two entities in the sentence to be recognized with different identifiers, and inputting a new sentence obtained through replacement to the relation recognition model, such that the relation recognition model outputs an M-dimensional relation vector corresponding to the two entities.

In some embodiments, the relation recognition model includes a sub-model of a transformer structure and a relation classification neural network. The inputting a new sentence obtained through replacement to the relation recognition model, such that the relation recognition model outputs an M-dimensional relation vector corresponding to the two entities includes:

inputting the new sentence to the sub-model of the transformer structure, to obtain a feature vector with the identifiers of the two entities; and inputting the feature vector with the identifiers of the two entities to the relation classification neural network, to obtain the M-dimensional relation vector corresponding to the two entities.

In some embodiments, the optimizing a currently obtained tensor to obtain the N×N×M-dimensional tensor includes:

taking the currently obtained tensor as an initial three-dimensional matrix, and decomposing the initial three-dimensional matrix into M N×N-dimensional matrices $X_i$, where i=1, 2, . . . , M;

decomposing a d×d×M-dimensional tensor O obtained through initialization into M pieces of d×N× d-dimensional matrices $O_i$, where d represents an adjustable hyper-parameter;

obtaining an N×d-dimensional matrix A through initialization, and calculating optimal A' and M pieces of optimal $O_i'$ based on $X_i=AO_iAT$ and a gradient descent method;

obtaining a new three-dimensional matrix based on the optimal A' and the M pieces of optimal $O_i'$; and comparing the initial three-dimensional matrix with the new three-dimensional matrix bit by bit based on a max function, and reserving a maximum value at each location, to obtain the N×N×M-dimensional tensor.

In some embodiments, the determining a correlation between each second entity and the target sentence includes:

for each second entity, determining a normalization result of a sum of a correlation degree between each first entity in the target sentence and the second entity as the correlation between the second entity and the target sentence.

In some embodiments, a correlation degree between any first entity and any second entity is a maximum relation probability value of the first entity relative to the second entity plus a maximum relation probability value of the second entity relative to the first entity.

In some embodiments, the determining each first entity in the target sentence includes:

converting each word in the target sentence into a 1024-dimensional vector, to obtain a vector set; and inputting the vector set to an entity recognition model, such that the entity recognition model recognizes each first entity in the target sentence.

According to a second aspect, an embodiment of the present application provides a natural language processing apparatus, including:

an obtaining module, configured to obtain a target sentence to be processed, and determine each first entity in the target sentence;

an extension module, configured to: for each first entity, in response to the first entity being present in a preset entity set, determine, in the preset entity set, a second entity in maximum correlation with the first entity, generate extended information based on the determined second entity, and add the extended information after a location of the first entity in the target sentence, to obtain an updated target sentence, where the second entity is any entity in the preset entity set other than the first entity; and a processing module, configured to input the updated target sentence to a BERT model, such that the BERT model performs a natural language processing task.

According to a third aspect, an embodiment of the present application provides an electronic device, including:

a memory, configured to store computer-readable instructions; and a processor, configured to execute the computer-readable instructions, to implement the natural language processing method according to any foregoing embodiment.

According to a fourth aspect, the present application provides one or more non-volatile computer-readable storage media storing computer-readable instructions. When the computer-readable instructions are executed by one or more processors, the one or more processors are enabled to perform the steps of the natural language processing method according to any foregoing embodiment.

BRIEF DESCRIPTION OF THE DRAWINGS

To describe the technical solutions in the embodiments of the present application or the related art more clearly, the following briefly describes the accompanying drawings required for describing the embodiments or the related art. It is clear that the accompanying drawings in the following description show merely the embodiments of the present application, and a person of ordinary skill in the art may still derive other drawings from these accompanying drawings without creative efforts.

DETAILED DESCRIPTION

The following clearly and completely describes the technical solutions in the embodiments of the present application with reference to the accompanying drawings in the embodiments of the present application. It is clear that the described embodiments are merely some but not all of the embodiments of the present application. All other embodiments obtained by a person of ordinary skill in the art based on the embodiments of the present application without creative efforts shall fall within the protection scope of the present application.

Currently, although related extended information may be added for input data of a BERT model, a current extension manner is likely to bring excessive noise, increasing an input data amount and affecting accuracy of the BERT model. As a result, the current BERT model may affect processing efficiency and processing effects of the BERT model. The embodiments of the present application provide a natural language processing solution, to extend effective information for the input data of the BERT model and improve processing accuracy of the BERT model in a natural language processing task.

Figure 1:
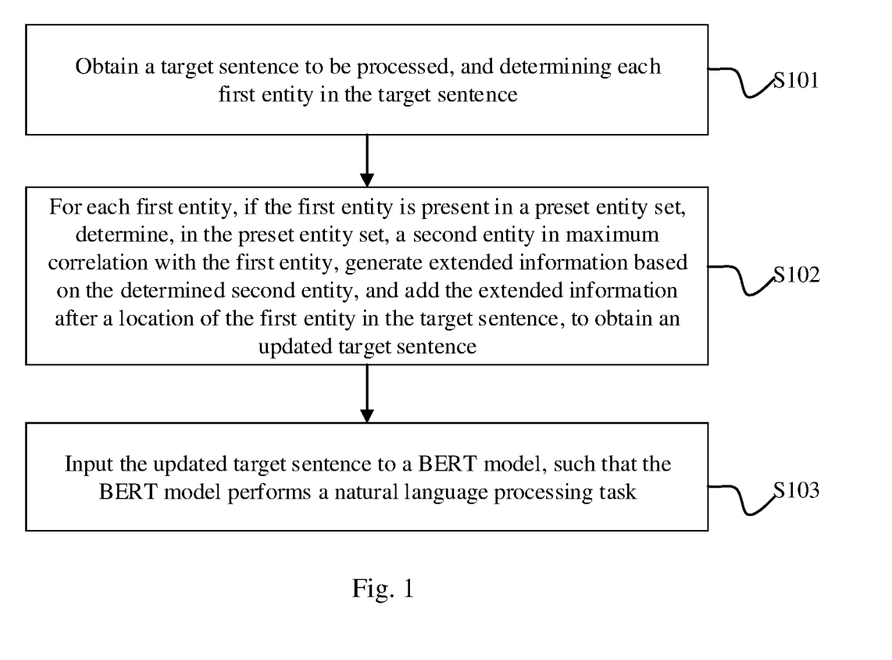
FIG. 1 is a flowchart of a natural language processing method according to one or more embodiments.

As shown in FIG. 1, an embodiment of the present application discloses a natural language processing method, including step S101, step S102, and step S103.

In step S101, a target sentence to be processed is obtained, and each first entity in the target sentence is determined.

In this embodiment, a noun in the target sentence is referred to as a first entity. The target sentence includes at least one first entity. For example, a sentence "Company A managed by Xiaoming runs a clothing business" includes three first entities: Xiaoming, Company A, and clothing business.

In step S102, for each first entity, if the first entity is present in a preset entity set, a second entity in maximum correlation with the first entity is determined in the preset entity set, extended information is generated based on the determined second entity, and the extended information is added after a location of the first entity in the target sentence, to obtain an updated target sentence.

The second entity is any entity in the preset entity set other than the first entity.

In some embodiments, step S102 may include: for each first entity, in response to the first entity being present in the preset entity set, the second entity in maximum correlation with the first entity is determined in the preset entity set, the extended information is generated based on the determined second entity, and the extended information is added after the location of the first entity in the target sentence, to obtain the updated target sentence.

It should be noted that in this embodiment, a noun in the preset entity set is referred to as a second entity. The preset entity set is a collection of second entities. If a first entity in the target sentence is present in the preset entity set, it indicates that a second entity in correlation with the first entity may be found from the preset entity set. In this case, one second entity in maximum correlation with the first entity is determined in the preset entity set, extended information is generated based on the determined one second entity, and then the extended information is added after a location of the first entity in the target sentence, to add effective extended information for the first entity. Accordingly, effective extended information may be added for each first entity that is in the target sentence and that is present in the preset entity set, and then the updated target sentence may be obtained. No extended information is added for a first entity that is in the target sentence and that is not present in the preset entity set.

It is assumed that the target sentence is "Xiaoming starts Company A". Extended information added for a first entity "Xiaoming" is "is Chinese", where "Chinese" is a second entity in the preset entity set. Extended information added for a first entity "Company A" is "running a clothing business", where "clothing business" is a second entity in the preset entity set. In this case, a finally obtained updated target sentence is "Xiaoming is Chinese, and starts Company A running a clothing business", where "is" is a relational term that connects "Xiaoming" and "Chinese", and "running" is a relational term that connects "Company A" and "clothing business". Such relational words may be determined according to idiomatic phrases.

In step S103, the updated target sentence is input to a BERT model, such that the BERT model performs a natural language processing task.

In this embodiment, the updated target sentence is used as input data of the BERT model, whereby the BERT model can obtain more information when performing a natural language processing task. Therefore, processing accuracy and effects can be improved.

If the BERT model processes a question answering task, after obtaining a question, the BERT model may add extended information for each entity in the question according to this embodiment, to update the question. After a new question is obtained through updating, the new question is processed, to determine a best answer to the new question.

It can be learned that in this embodiment, the extended information can be added for each first entity in the target sentence. In addition, the added extended information is generated based on the corresponding second entity in maximum correlation with the first entity, whereby the added extended information is highly correlated with each first entity in the target sentence. Therefore, effective extended information can be added for the target sentence that is used as the input data of the BERT model, to improve processing accuracy of the BERT model in a natural language processing task and improve processing efficiency and processing effects of the BERT model.

In a specific implementation, that a second entity in maximum correlation with the first entity is determined in the preset entity set includes: the first entity is used as a target object, and a maximum relation probability value of the target object relative to each second entity is determined, to obtain N−1 pieces of maximum relation probability values, where N−1 represents a quantity of second entities, and N represents a total quantity of entities included in the preset entity set: a correlation between each second entity and the target sentence is determined, to obtain N−1 pieces of correlations; for each second entity, a product of the correlation corresponding to the second entity and the maximum relation probability value corresponding to the second entity is calculated, to obtain a correlation score corresponding to the second entity to obtain N−1 pieces of correlation scores; and a second entity corresponding to a maximum correlation score of the N−1 pieces of correlation scores is used as the second entity in maximum correlation with the target object.

If the preset entity set includes N pieces of entities, N being a positive integer, when any first entity W is present in the preset entity set, one maximum relation probability value of the first entity W relative to each of the other N−1 pieces of second entities may be determined, whereby N−1 pieces of maximum relation probability values are obtained.

Because a relation between one first entity and one second entity is represented by an M-dimensional vector, the M-dimensional vector includes M relation probability values. In this embodiment, a maximum value in the M pieces of relation probability values is determined as a maximum relation probability value between the first entity and the second entity.

In addition, one correlation between each of the N−1 pieces of second entities in the preset entity set other than the first entity W and the target sentence may be calculated, whereby N−1 pieces of correlations are obtained.

Therefore, any second entity corresponds to one correlation and one maximum relation probability value, and a product of the correlation and the maximum relation probability value may be calculated to obtain a correlation score. Because there are N−1 pieces of second entities, N−1 pieces of correlation scores may be obtained. A second entity corresponding to the maximum correlation score of the N−1 pieces of correlation scores is an entity that is in maximum correlation with the first entity W and also in maximum correlation with the target sentence, and thus is used as a second entity in maximum correlation with the first entity W. Extended information generated based on the second entity in maximum correlation with the first entity W may be regarded as effective and accurate extended information of the first entity W. Therefore, information extension precision and accuracy might be improved, and ineffective and inaccurate extended information might be avoided.

In an implementation, that a correlation between each second entity and the target sentence is determined includes: for each second entity, a normalization result of a sum of a correlation degree between each first entity in the target sentence and the second entity is determined as the correlation between the second entity and the target sentence. A correlation degree between any first entity and any second entity is a maximum relation probability value of the first entity relative to the second entity plus a maximum relation probability value of the second entity relative to the first entity.

If the target sentence includes three first entities: A, B, and C, a correlation between the target sentence and a second entity F is a sum of a correlation degree between A and F, a correlation degree of B and F, and a correlation degree between C and F. The calculated sum needs to be normalized. The correlation degree between A and F is a maximum relation probability value of A relative to F plus a maximum relation probability value of F relative to A. The correlation degree between B and F is a maximum relation probability value of B relative to F plus a maximum relation probability value of F relative to B. The correlation degree between C and F is a maximum relation probability value of C relative to F plus a maximum relation probability value of F relative to C. It might be learned that a correlation degree between any two entities is calculated by finding two maximum relation probability values related to the two entities from a tensor, then summing the two maximum relation probability values, and performing normalization.

A value in each dimension in an M-dimensional relation vector ranges from 0 to 1. Each value represents a probability of a corresponding relation. A sum of values in all dimensions is 1.

In an implementation, that a maximum relation probability value of the target object relative to each second entity is determined includes: an N×N×M-dimensional tensor for representing a relation and a relation probability value between entities in the preset entity set is generated, where M represents a quantity of dimensions of a relation vector between different entities in the preset entity set; and a knowledge graph is generated based on the N×N×M-dimensional tensor, and the maximum relation probability value of the target object relative to each second entity is queried in the knowledge graph. The N×N×M-dimensional tensor is equivalent to the knowledge graph. Therefore, generating the knowledge graph based on the N×N×M-dimensional tensor is just representing related information in the tensor in a manner of the knowledge graph.

It might be learned that a maximum relation probability value of each first entity relative to each second entity might be obtained through query in the knowledge graph. The knowledge graph is generated based on the N×N×M-dimensional tensor. A generation process of the N×N×M-dimensional tensor includes: generating an initial tensor that is all-0 in N×N×M dimensions: obtaining a sentence library for generating the preset entity set, traversing each sentence in the sentence library, and using the traversed sentence as a sentence to be recognized: using two adjacent entities in the sentence to be recognized as an entity group, to obtain a plurality of entity groups:

recognizing a relation between two entities in each entity group by using a relation recognition model, to obtain a plurality of M-dimensional relation vectors: for each M-dimensional relation vector, if a maximum value in any M-dimensional relation vector is greater than a preset threshold, updating an element at a location that corresponds to the maximum value and that is in the initial tensor from 0 to 1, to update the initial tensor: traversing a next sentence in the sentence library, and continuing to update a current tensor, where after each sentence in the sentence library is traversed, elements at some locations in the all-0 initial tensor may be changed to 1, while elements at some locations remain 0, whereby a tensor including 0 and 1 is obtained; and simultaneously optimizing the currently obtained tensor including 0 and 1, to obtain the N×N×M-dimensional tensor. For each M-dimensional relation vector, if a maximum value in any M-dimensional relation vector is greater than the preset threshold, the updating an element at a location that corresponds to the maximum value and that is in the initial tensor from 0 to 1 includes: for each M-dimensional relation vector, in response to a maximum value in any M-dimensional relation vector being greater than the preset threshold, updating an element at a location that corresponds to the maximum value and that is in the initial tensor from 0 to 1, to update the initial tensor.

In an implementation, the recognizing a relation between two entities in each entity group by using a relation recognition model, to obtain a plurality of M-dimensional relation vectors includes: for two entities in any entity group, replacing the two entities in the sentence to be recognized with different identifiers, and inputting a new sentence obtained through replacement to the relation recognition model, such that the relation recognition model outputs an M-dimensional relation vector corresponding to the two entities.

Figure 2:
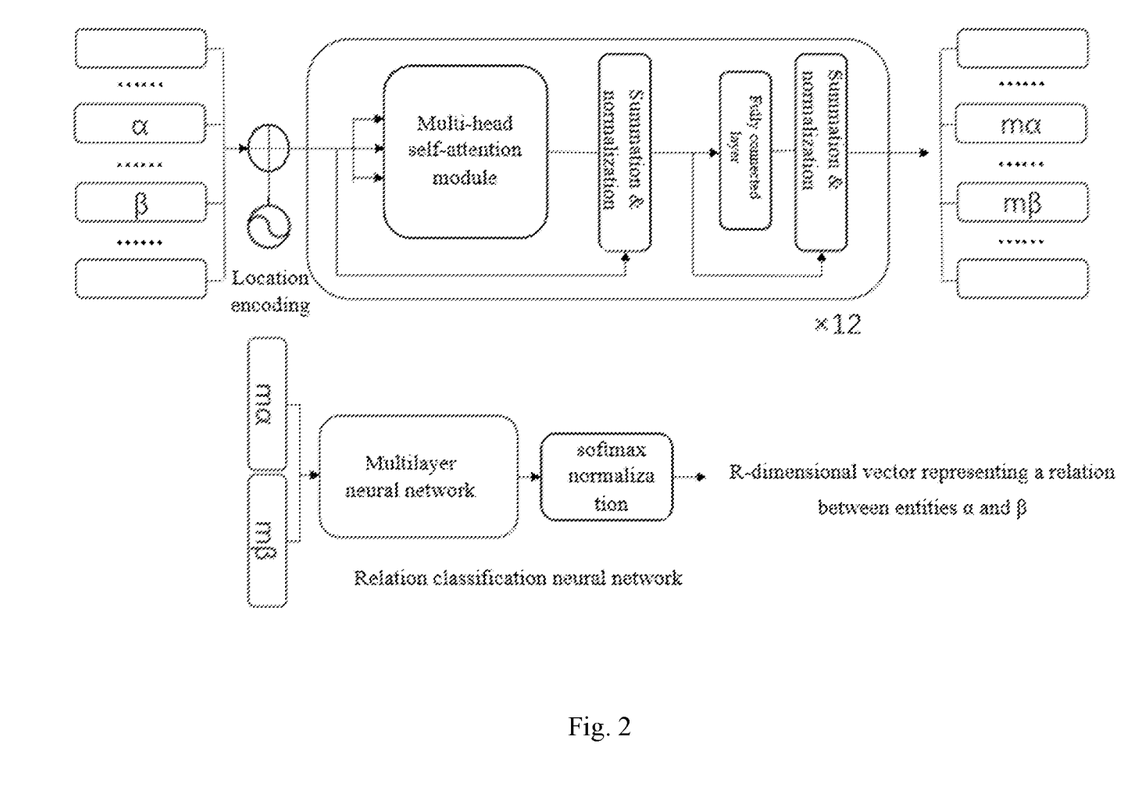
FIG. 2 is a schematic diagram of a relation recognition model according to one or more embodiments.

Referring to FIG. 2., the relation recognition model may include a sub-model of a transformer structure and a relation classification neural network. The sub-model of the transformer structure includes 12 multi-head attention modules. Certainly, the relation recognition model may be of another structure.

Any new sentence is first input to the sub-model of the transformer structure, to obtain two feature vectors: $m\alpha$ and $m\beta$. Then, ma and mβ are input to the relation classification neural network, to obtain M relations and M relation probability values between $\alpha$ and $\beta$. The M relations and the M relation probability values are represented by an M-dimensional relation vector. Each element in the vector is a relation probability value, $\alpha$ and $\beta$ are different identifiers for replacing two adjacent entities. Therefore, the M relations and the M relation probability values between $\alpha$ and $\beta$ are M relations and M relation probability values between the two adjacent entities that are replaced.

In some embodiments, adjacent entities may be replaced with $\alpha$ and $\beta$ with reference to the following example. It is assumed that the sentence to be recognized is "Company A managed by Xiaoming runs a clothing business". Two entity groups may be determined accordingly: "Xiaoming+Company A" and "Company A+clothing business". Therefore, two new sentences may be obtained: (1) β managed by a runs a clothing business; and (2) a managed by Xiaoming runs B.

It should be noted that an M-dimensional relation vector calculated for the new sentence (1) represents a relation between "Xiaoming" and "Company A". If a clause "β is in α" is obtained based on a sentence "Xiaoming is in Company A", an M-dimensional relation vector calculated for the clause "B is in a" represents a relation between "Company A" and "Xiaoming". It can be learned that after the two adjacent entities are transposed, relation recognition needs to be performed again with the relation recognition model.

It should be noted that when a relation between two entities is presented as 0 in the tensor, there may be the following two cases: (1) there is no relation between the two entities; and (2) there is the relation between the two entities but the relation is missing. To determine such cases, in the present application, after the tensor including 0 and 1 is obtained, the currently obtained tensor including 0 and 1 is further optimized.

In an implementation, the optimizing a currently obtained tensor to obtain the N×N×M-dimensional tensor includes: taking the currently obtained tensor as an initial three-dimensional matrix (that is, a matrix including 0 and 1), and decomposing the initial three-dimensional matrix into M N×N-dimensional matrices $X_i$, where i=1, 2, . . . , M; decomposing a d×d×M-dimensional tensor O obtained through initialization into M pieces of d×d-dimensional matrices $O_i$, where d is an adjustable hyper-parameter: obtaining an N×d-dimensional matrix A through initialization, and calculating optimal A' and M pieces of optimal $O_i$' based on $X_i=AO_iA^T$ and a gradient descent method; obtaining a new three-dimensional matrix based on the optimal A' and the M pieces of optimal $O_i$'; and comparing the initial three-dimensional matrix with the new three-dimensional matrix bit by bit based on a max function, and reserving a maximum value at each location, to obtain the N×N×M-dimensional tensor.

Generally, matrix transformation may be performed by a matrix decomposition method. Because the tensor in the present application is an N×N×M-dimensional matrix, the N×N×M-dimensional tensor needs to be first decomposed into M N×N-dimensional matrices: $X_1$ . . . . $X_i$ . . . . $X_M$, and the d×d×M-dimensional tensor O obtained through initialization is simultaneously decomposed into M d×d-dimensional matrices: $O_1$ . . . . $O_i$ . . . . $O_M$. In this way, each $X_i$ may be decomposed into $AO_iA_T$, that is, $X_1=AO_1A^T$, $X_2=AO_2A^T$, . . . , and $X'_M=A'O_MA'^T$. Therefore, the optimal A' and the M pieces of optimal $O_i$' may be calculated based on the gradient descent method, that is, optimal A' and optimal $O_i$' in the foregoing M equations are calculated. Then, $X'_1=A'O_1A'^T$, $X'_2=A'O_2A'^T$, . . . , and $X'M=A'O_MA'^T$ are calculated to obtain M calculation results: $X'_1$ . . . . $X'_i$ . . . . $X'_M$. The M calculation results may be spliced to obtain the new three-dimensional matrix. $A'^T$ is a transposed matrix of A'. Certainly, if M optimal $O_i$' is obtained: $O'_1$ . . . . $O'_i$ . . . . $O'_M$, $O'_1$ . . . . $O'_i$ . . . . O'M may be spliced to obtain a new d×d×M-dimensional tensor O, and the new three-dimensional matrix may be obtained based on $XAOA^T$.

Then, elements in the initial three-dimensional matrix and the new three-dimensional matrix are compared bit by bit, and the maximum value at each location is reserved, to obtain the N×N×M-dimensional tensor. For example, for a specific location, an element in the initial three-dimensional matrix is 0, and an element in the new three-dimensional matrix is 0.02. In this case, an element at the location in X" is denoted as 0.02. For another example, for a specific location, an element in the initial three-dimensional matrix is 1, and an element in the new three-dimensional matrix is 0.99. In this case, an element at the location in X" is denoted as 1.

Figure 3:
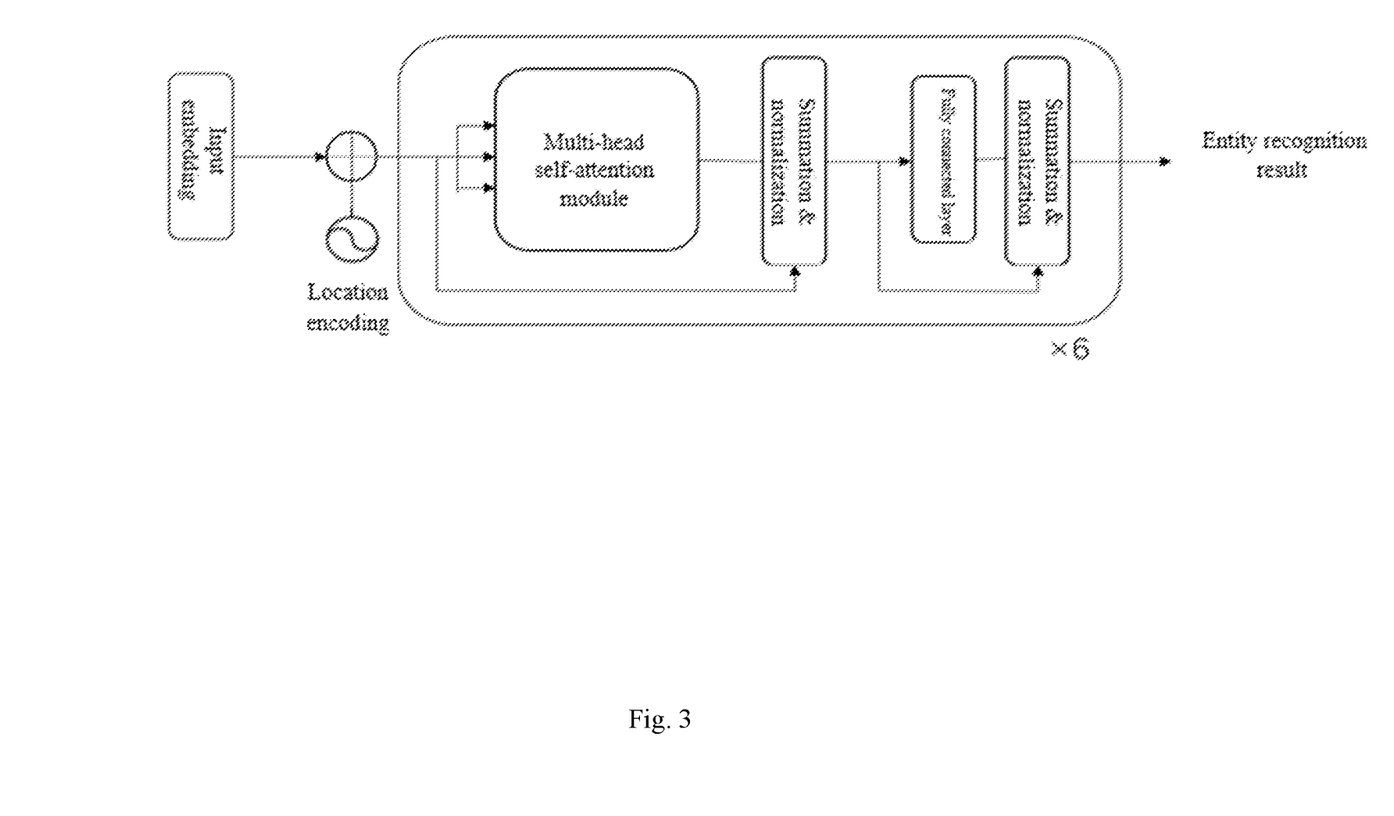
FIG. 3 is a schematic diagram of an entity recognition model according to one or more embodiments.

In an implementation, that each first entity in the target sentence is determined includes: each word in the target sentence is converted into a 1024-dimensional vector, to obtain a vector set; and the vector set is input to an entity recognition model, such that the entity recognition model recognizes each first entity in the target sentence.

For the entity recognition model, refer to FIG. 3. The entity recognition model shown in FIG. 3 is implemented based on a transformer, and includes six multi-head self-attention modules. Certainly, the entity recognition model may be implemented based on another structure. "Location encoding" in FIG. 2 and FIG. 3 is used to record a location of each word in a sentence in the sentence.

For a sentence "北京是中国的首都 (Beijing is the capital of China)", a recognition result output by the entity recognition model may be: 北京是中国的首都 AABAABBB), where A represents an entity, and B represents a non-entity.

In the following embodiment, professional knowledge in a knowledge graph is added to input data of a BERT model through steps of data preparation, entity recognition, relation recognition, knowledge graph construction, information value assessment, and information embedding, whereby accuracy of the BERT model in a natural language processing task is improved.

1. Data Preparation

A sentence library including a plenty of sentences is constructed. A word table W including all words is constructed for all texts in the sentence library. In addition, the word table W further includes two special identifiers α and β. The word table W may be used to determine a relational word between two entities.

2. Entity Recognition

A model capable of performing entity recognition on a text is constructed, to obtain an entity recognition model. The entity recognition model may In some embodiments be as shown in FIG. 3. A sentence is randomly extracted from the sentence library, and manual annotation is performed to obtain a training text. A model is trained with the manually annotated text to obtain the entity recognition model. For a specific training process, refer to the related art. Details are not described herein again.

Each word included in the word table W is converted into a Z-dimensional one-hot vector. Then, the Z-dimensional one-hot vector is mapped into a 1024-dimensional vector through a matrix JE $R^{1024 \times Z}$. R is a preset real number set. Therefore, each word may be represented by one 1024-dimensional vector.

For a specific sentence in the sentence library, each word in the sentence is represented by a 1024-dimensional vector, whereby a set of 1024-dimensional vectors may be obtained. The set is input to the entity recognition model, whereby each entity in the sentence may be recognized.

3. Relation Recognition

An entity in each sentence in the sentence library may be recognized through the entity recognition model. Therefore, for each sentence, a relation between entities in the sentence may be further recognized.

A relation table G including a relation of interest is first constructed. The relation table G includes M different relations, one of which is defined as irrelevance representing that there is no relation between two entities. The relation table G is customized based on a requirement. Each relation in the relation table corresponds to one M-dimensional one-hot vector. It is specified that a kth relation in the M-dimensional one-hot vector is denoted as $r_k$ and corresponds to a kth dimension of the vector.

Then, two adjacent entities in a sentence are replaced with α and β. A method for replacing an entity in a sentence includes: for a sentence, after all entities in the sentence are determined, replacing two adjacent entities in the sentence in sequence.

In some embodiments, the sentence is first traversed word by word. All words corresponding to a first entity in the sentence are replaced with α, and all words corresponding to a second entity in the sentence are replaced with β, to obtain a clause (that is, a new sentence). From the second entity in the sentence, all words corresponding to the second entity in the sentence are replaced with α, and all words corresponding to a third entity are replaced with β, to obtain a second clause. The operations are repeated until all entities in the sentence are replaced. It is assumed that the sentence is "Company A managed by Xiaoming runs a clothing business". Two entity groups may be determined accordingly: "Xiaoming+Company A" and "Company A+clothing business". Therefore, two clauses may be obtained: (1)β managed by α runs a clothing business; and (2)α managed by Xiaoming runs β.

A relation recognition model is constructed. A small part of sentences are randomly extracted from the sentence library to form a training set. Entity replacement is performed on each sentence. For a sentence including q pieces of entities, q–1 pieces of clauses may be obtained through replacement. For each clause, a relation between α and β is determined based on a meaning of the clause. The corresponding relation is found from the relation table G for manual annotation. A label corresponding to each clause is an M-dimensional one-hot vector representing the relation between α and β. A logistic regression loss function training model is minimized by an ADAM algorithm, to obtain the relation recognition model. The relation recognition model may be as shown in FIG. 2. For a specific training process of the relation recognition model, refer to the related art. Details are not described herein again.

Because at least one clause may be obtained for one sentence, each clause is input to the relation recognition model, and a relation between adjacent entities of each group in the sentence may be output. A relation between every two adjacent entities is represented by an M-dimensional vector.

In some embodiments, the clause obtained through entity replacement is input to the relation recognition model shown in FIG. 2, and two vectors mα and mβ corresponding to α and β may be output from a transformer. The two vectors are spliced to obtain a vector h=<hα|hβ>. In this case, the vector h includes context information of the two entities. Then, the vector h is input to a relation classification neural network for relation classification. An output layer of the network is a softmax normalization layer, and may output an M-dimensional vector $v=(p_1, p_2, \ldots, p_M)$, where a value in each dimension represents a probability that a relation between α and β in the input clause is a corresponding relation in G.

For example, if the output vector is $(p_1, p_2, \ldots, p_M)$, a first dimension, a second dimension, . . . , and an $M^{th}$ dimension correspond to relations $r_1, r_2, \ldots, r_M$ respectively.

In this case, it may be considered that a probability that there is the relation $r_1$ between α and β in the input clause is $p_1$, a probability that there is the relation $r_2$ is $p_2$, . . . , and a probability that there is the relation $r_M$ is $p_M$. Because the relation between the entities is determined by overall semantics of the sentence, and is unrelated to the entities, the relation between α and β is equivalent to a relation between the two entities that are replaced in the original sentence.

4. Knowledge Graph Construction

All entities in the sentence library are recognized by the entity recognition model, and repeated entities are removed, to obtain an entity table E (that is, a preset entity library). The entity library E includes N entities in total. It is specified that $e_i$ is an $i^{th}$ entity in E, where 1≤i≤N.

A relation between two adjacent entities in each sentence is recognized by the relation recognition model, and the knowledge graph is constructed. The knowledge graph is quantitatively represented by an N×N×M-dimensional tensor. It can be learned from the tensor whether there is any relation included in the relation table G between any two entities included in the entity table E. N is a quantity of entities included in the entity table E. M is a quantity of relations included in the relation table G. $X_{ijk}$ represents an element at one location in the tensor, and corresponds to two entities in the entity table E and one relation in the relation table G. A correspondence rule is that $X_{ijk}$ represents the $i^{th}$ entity $e_i$ and a $j^{th}$ entity $e_j$ in the entity table E and a $k^{th}$ relation $r_k$ in the relation table G.

In some embodiments, a construction process of the knowledge graph includes the following steps.

In (1), an initial N×N×M-dimensional tensor X is constructed. In this case, all values in X are initialized to 0.

In (2), a relation between two adjacent entities in each sentence in the sentence library is recognized by the relation recognition model, to obtain a plurality of M-dimensional vectors. For any M-dimensional vector, a dimension corresponding to a maximum value in the vector is found, and the initial N×N×M-dimensional vector X is updated based on a relation corresponding to the dimension and entities replaced with α and β in a clause.

For example, it is assumed that for a specific clause, an output M-dimensional relation vector is $v=(p_1, p_2, \ldots, p_M)$, where a value $p_x$ corresponding to the $k^{th}$ dimension is maximum, and the dimension corresponds to a $k^{th}$ relation $r_k$ (1≤k≤M) in the relation table G. It is also assumed that two entities replaced with α and β in the clause correspond to the $i^{th}$ entity $e_i$ and the $j^{th}$ entity $e_j$ (1≤i, j≤N) in the entity table E. In this case, when and only when $p_k$ is greater than a preset value θ (0<θ<1), it is considered that there is the relation $r_k$ between the entities $e_i$ and $e_j$, and $X_{ijk}$ in X is initialized to 1; or when $p_k$ is not greater than a preset value θ, $X_{ijk}$ in X is initialized to 0. The preset value θ is a preset threshold.

For all M-dimensional vectors, X is continuously updated accordingly. After all the M-dimensional vectors are processed, finally obtained X is output.

In (3), X finally obtained in step (2) is optimized based on tensor decomposition, to supplement the knowledge graph with potential information.

X obtained through step (2) is usually sparse. In this step, inference is performed on a potential relation in X through tensor decomposition, to mine the potential relation, whereby knowledge (relation between entities) in the knowledge graph is completed.

For X obtained in step (2), if $X_{ijk}=1$ for a specific point in X, it indicates that there is the $k^{th}$ relation $r_k$ in the relation table G between the $i^{th}$ entity $e_i$ in the entity table E and the $j^{th}$ entity $e_j$ in the entity table: or if $X_{ijk}=0$, it cannot be determined whether there is no such relation or information recording the relation is missing.

Therefore, in this step, a value at a location that is originally 0 in X is inferred through an element that is 1 in X, that is, a probability that there is an undetermined relation is inferred through an existing determined relation. For example, if relations (Xiaoming, manage, Company A), (Xiaoma, manage, Company B), (Company A, run, clothing business), (Company B, run, WeChat), and (Xiaoming, manage, clothing business) are known, it may be inferred that a probability that (Xiaoma, manage, WeChat) is true is high, and the knowledge graph may be supplemented accordingly.

The following describes in detail a method for supplementing X through tensor decomposition, including: the tensor X is decomposed into X~AOA$^T$ (A is an N×d-dimensional matrix, O is a d×d×M-dimensional tensor, d is an adjustable hyper-parameter, and A$^T$ is a transposed matrix of A), A and O are updated by a gradient descent method, and after a loss function converges to be small enough, X is updated based on a tensor X'=AOA$^T$.

The following specific implementation steps are included. The tensor X is decomposed into M pieces of N×N-dimensional matrices $X_1, \ldots, X_M$, and the N×d-dimensional matrix A and M d×d-dimensional tensors $O_1, \ldots, O_M$ are simultaneously constructed, to decompose $X_1, \ldots, X_M$ into $AO_1A^T, \ldots, AO_MA^T$.

After the matrices A and $O_1, \ldots, O_M$ are randomly initialized, the loss function $$L = \sum_{l=1}^{M} \|X_l - AO_lA^T\|_F^2 + \lambda\left(\|A\|_F^2 + \sum_{l=1}^{M}\|O_l\|_F^2\right)$$

is minimized by the gradient descent method, and then there is:

$$\frac{dL}{dA} = -2\sum_{l=1}^{M}\left[(X - AO_lA^T)AO_l^T + (X - AO_lA^T)^T AO_l\right] + 2\lambda A^T$$

$$\frac{dL}{dO_l} = -2A^T(X - AO_lA^T)A + 2\lambda O^T,$$

A and $O_1, \ldots, O_M$ are updated accordingly in each cycle:

$$A = A - \eta\frac{dL}{dA},$$

$$O_l = O_l - \eta\frac{dL}{dO_l}.$$

$\eta$ is a learning rate, and i=1, ..., M.

After the loss function converges to be small enough after a plurality of cycles, optimal A and optimal $O_1, \ldots, O_M$ are obtained, and $O_1, \ldots, O_M$ are spliced to obtain a new tensor O.

Then, the tensor X'=AOA$^T$ is calculated, and values at locations in X' and X are maximized one by one, to update the tensor X, that is, final X"ijk=max ($X_{ijk}'$, $X_{ijk}$). After updated, a value at each point in the tensor X represents a probability that there is a relation corresponding to the point in the relation table G between two entities corresponding to the point in the entity table E, or credibility of information indicating that there is a relation between two entities. For example, $X_{ijk}$ corresponds to the i$^{th}$ entity $e_i$ and the j$^{th}$ entity $e_j$ in the entity table E and the k$^{th}$ relation $r_k$ in the relation table G. In this case, $X_{ijk}=0.8$ indicates that a probability that there is the relation $r_j$ between the entity $e_j$ and the entity $e_j$ is 0.8.

Finally, the knowledge graph is generated based on the finally obtained X".

5. Information Value Assessment and Information Embedding

For a specific sentence T to be input to the BERT model for a natural language processing task, some information in the knowledge graph is inserted into the sentence T. Then, how to select, from the knowledge graph, information required to be inserted? In this step, a correlation degree between entities and a correlation between an entity in the information to be inserted and the sentence are calculated, to assess a value of the information to be inserted for the sentence, and information with a maximum value is selected for insertion.

In (1), a correlation degree between any two entities in the entity table E is calculated.

Because the knowledge graph (the tensor X") constructed through the foregoing steps represents a probability that there is a specific relation in the relation table G between any two entities in the entity table E, the correlation degree between the two entities is measured by a sum of probabilities that there is a maximum relation in the relation table G between the two entities, and a correlation degree score is obtained through softmax normalization. For example, for the i$^{th}$ entity $e_j$ and the j$^{th}$ entity $e_j$ in the entity table E, a correlation degree score of the two entities is:

$$s(i, j) = \frac{e^{\left(\sum_{k=1}^{M}(X_{ijk}+X_{jik})\right)}}{\sum_{j=1}^{N} e^{\left(\sum_{k=1}^{M}(X_{ijk}+X_{jik})\right)}}$$

It is considered that there are more relations between two entities, a correlation between the two entities is higher. $X_{ijk}$ corresponds to a probability value that there is the k$^{th}$ relation $r_k$ in the relation table G between the j$^{th}$ entity $e_j$ and the i$^{th}$ entity $e_j$ in the entity table E.

In (2), a correlation score between the entity in the information to be inserted and the sentence is calculated.

It is considered that if correlation degrees between all entities in a sentence and a specific entity in the entity table are higher, a correlation between the sentence and the entity is higher. Therefore, a correlation score between the sentence and the entity is calculated based on the correlation degree between the entities obtained above.

It is assumed that a sentence T intersects p entities $e_{t1}, \ldots, e_{tp}$ in the entity table E in total. In this case, a correlation between the sentence T and the entity $e_j$ in the entity table E is measured by a normalization result of a sum of correlation degrees between the entities $e_{t1}, \ldots, e_{tp}$ and the entity $e_i$, that is, a correlation degree score between T and $e_j$ is:

$$Y(i, T) = \frac{e^{\left(\sum_{j=1}^{p} s(i,t_j)\right)}}{\sum_{i=1}^{N} e^{\left(\sum_{j=1}^{p} s(i,t_j)\right)}}$$

N represents the quantity of entities included in the entity table E, and p represents a quantity of relations included in the entity table E and the sentence T.

In (3), the information (relation between entities) to be inserted into the sentence T is selected below based on a correlation score function Y and the knowledge graph (the tensor X"). The information represents knowledge that there is a specific relation between two entities. For example, "there is the relation $r_k$ between the entity $e_j$ and the entity $e_j$" is a piece of information. The value of the information for a specific sentence is in positive correlation with a probability of presence of the information and a correlation between the information and the sentence.

The sentence T is traversed word by word, to find totally p entities $e_{t1}, \ldots, e_{tp}$ that are present in both the sentence T and the entity table E, corresponding to $(t_1)^{th}, \ldots, (t_p)^{th}$ entities in the entity table E. Then, correlation scores $Y(1, T), \ldots, Y(N, T)$ between the sentence T and entities in the entity table are calculated based on the correlation score function Y.

Then, supplementary information is selected for each of the entities $e_{t1}, \ldots, e_{tp}$ in the sentence T. The supplementary information is selected by the following method: for a specific entity $e_q (q \in \{t_1, \ldots, t_p\})$ in $e_{t1}, \ldots, e_{tp}$, probabilities $X_{qi1}, \ldots, X_{qiM}$ that there are respectively the M relations in the relation table G between the entity $e_q$ and any other entity $e_i$ ($i \neq q$) in the entity table are obtained from the tensor X". A maximum value in the M relation probabilities between the entity eq and the entity $e_i$ ($i \neq q$) is calculated, to obtain a maximum relation probability between $e_q$ and $e_i$.

The foregoing operations may be performed on all of the N−1 pieces of entities different from $e_q$ in the entity table E, to obtain N−1 pieces of maximum relation probabilities of $e_q$.

It is assumed that the N−1 pieces of maximum relation probabilities are that there is a $(k_1)^{th}$ relation $r_{k1}$ in the relation table G between $e_q$ and $e_{j1}$, there is a $k_2^{th}$ relation $r_{k2}$ in the relation table G between $e_q$ and $e_{j2}, \ldots,$ and there is an $(N-1)^{th}$ relation $r_{kN-1}$ between $e_q$ and $e_{jN-1}$, where $e_{ji}, \ldots, e_{jN-1}$ are entities in the entity table E other than $e_q$. In this case, the N−1 maximum relation probabilities are $X_{q,i,k}, \ldots X_{j_{N-1}k_{N-1}}$.

Then, the N−1 pieces of maximum relation probabilities are multiplied by the correlation score between T and $e_i$, to obtain N−1 pieces of information assessed values. An entity and information (relation between entities) that correspond to a maximum value in the N−1 pieces of information assessed values are selected to perform information insertion after eq. In some embodiments, the determined entity and information are converted into a word through the entity table E, the relation table G, and the word table W, and the word is inserted after a location of the entity $e_q$ in the sentence.

The N−1 pieces of information assessed values may in some embodiments be:

$$V_1 = Y(j_1, T) * X_{qj_1k_1},$$
$$V_2 = Y(j_2, T) * X_{qj_2k_2}, \ldots, V_{N-1} = Y(j_{N-1}, T) * X_{qj_{N-1}k_{N-1}}.$$

$V_1$ to $V_{N-1}$ represent values of corresponding entities and information for the sentence T.

The entities $e_{t1}, \ldots, e_{tp}$ in T are traversed one by one, and information is inserted for each entity based on the foregoing steps, to finally obtain an information-extended sentence. The BERT model may process the information-extended sentence to obtain better processing effects.

In this embodiment, when the information to be inserted (relation between entities) is selected from the knowledge graph, the value of the information to be inserted for the sentence (reflected as a correlation between the information and the sentence and the credibility of the information) is fully considered. This ensures quality of the information to be inserted and reduces introduction of noise.

It might be learned that in this embodiment, an entity in a sentence may be recognized based on the entity recognition model, a relation between two adjacent entities in the sentence may be recognized by the relation recognition model, and the knowledge graph is constructed and optimized accordingly, to obtain the tensor "X" representing a relation between any two entities. In addition, the correlation degree between the entities and the correlation between an entity in the information to be inserted and the sentence are calculated, to assess a value of the information to be inserted for the sentence, whereby the information can be inserted more accurately and effectively, and introduction of noise is reduced.

The following describes a natural language processing apparatus provided in an embodiment of the present application. Reference may be made between the natural language processing apparatus described below and the natural language processing method described above.

Figure 4:
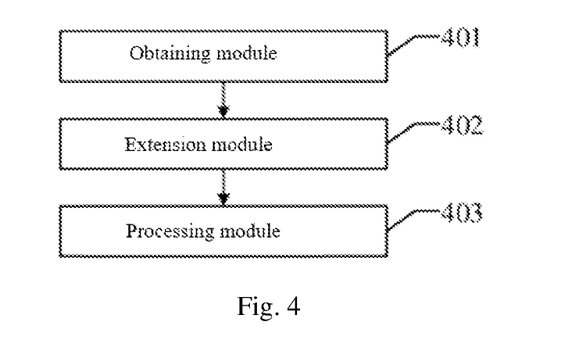
FIG. 4 is a schematic diagram of a natural language processing apparatus according to one or more embodiments.

As shown in FIG. 4, an embodiment of the present application discloses a natural language processing apparatus, including:

an obtaining module 401, configured to obtain a target sentence to be processed, and determine each first entity in the target sentence;

an extension module 402, configured to: for each first entity, if the first entity is present in a preset entity set, determine, in the preset entity set, a second entity in maximum correlation with the first entity, generate extended information based on the determined second entity, and add the extended information after a location of the first entity in the target sentence, to obtain an updated target sentence, where the second entity is any entity in the preset entity set other than the first entity; and a processing module 403, configured to input the updated target sentence to a BERT model, such that the BERT model performs a natural language processing task.

In some implementations, the extension module 402 is configured to: for each first entity, in response to the first entity being present in the preset entity set, determine, in the preset entity set, the second entity in maximum correlation with the first entity, generate the extended information based on the determined second entity, and add the extended information after the location of the first entity in the target sentence, to obtain the updated target sentence.

In a specific implementation, the extension module includes:

a first determining unit, configured to use the first entity as a target object, and determine a maximum relation probability value of the target object relative to each second entity, to obtain N−1 pieces of maximum relation probability values, where N−1 represents a quantity of second entities, and N represents a total quantity of entities comprised in the preset entity set;

a second determining unit, configured to determine a correlation between each second entity and the target sentence, to obtain N−1 pieces of correlations;

a calculation unit, configured to: for each second entity, calculate a product of the correlation corresponding to the second entity and the maximum relation probability value corresponding to the second entity, to obtain a correlation score corresponding to the second entity to obtain N−1 pieces of correlation scores; and a selection unit, configured to use a second entity corresponding to a maximum correlation score of the N−1 pieces of correlation scores as the second entity in maximum correlation with the target object.

In an implementation, the first determining unit includes:

a generation subunit, configured to generate an N×N×M-dimensional tensor for representing a relation and a relation probability value between entities in the preset entity set, where M represents a quantity of dimensions of a relation vector between different entities in the preset entity set; and a query subunit, configured to generate a knowledge graph based on the N×N×M-dimensional tensor, and query, in the knowledge graph, the maximum relation probability value of the target object relative to each second entity.

In an implementation, the generation subunit is configured to:

generate an initial tensor that is all—0 in N×N×M dimensions;

obtain a sentence library for generating the preset entity set, traverse each sentence in the sentence library, and use the traversed sentence as a sentence to be recognized;

use two adjacent entities in the sentence to be recognized as an entity group, to obtain a plurality of entity groups;

recognize a relation between two entities in each entity group by using a relation recognition model, to obtain a plurality of M-dimensional relation vectors;

for each M-dimensional relation vector, if a maximum value in any M-dimensional relation vector is greater than a preset threshold, update an element at a location that corresponds to the maximum value and that is in the initial tensor from 0 to 1, to update the initial tensor; and traverse a next sentence in the sentence library, continue to update a current tensor, and after each sentence in the sentence library is traversed, output and optimize a currently obtained tensor to obtain the N×N×M-dimensional tensor.

In some implementations, the generation subunit updates, for each M-dimensional relation vector, in response to a maximum value in any M-dimensional relation vector being greater than a preset threshold, an element at a location that corresponds to the maximum value and that is in the initial tensor from 0 to 1, to update the initial tensor.

In an implementation, the generation subunit is configured to:

for two entities in any entity group, replace the two entities in the sentence to be recognized with different identifiers, and input a new sentence obtained through replacement to the relation recognition model, such that the relation recognition model outputs an M-dimensional relation vector corresponding to the two entities.

In an implementation, the generation subunit is configured to:

use the currently obtained tensor as an initial three-dimensional matrix, and decompose the initial three-dimensional matrix into M N×N-dimensional matrices $X_i$, where i=1, 2, . . . , M;

decompose a d×d×M-dimensional tensor O obtained through initialization into M pieces of d×d-dimensional matrices $O_i$, where d represents an adjustable hyper-parameter;

obtain an N×d-dimensional matrix A through initialization, and calculate optimal A' and M pieces of optimal $O_i'$ based on $X_i = AO_iA^T$ and a gradient descent method;

obtain a new three-dimensional matrix based on the optimal A' and the M pieces of optimal $O_i'$; and compare the initial three-dimensional matrix with the new three-dimensional matrix bit by bit based on a max function, and reserve a maximum value at each location, to obtain the N×N×M-dimensional tensor.

In an implementation, the second determining unit is configured to:

for each second entity, determine a normalization result of a sum of a correlation degree between each first entity in the target sentence and the second entity as the correlation between the second entity and the target sentence.

In an implementation, a correlation degree between any first entity and any second entity is normalization result of a sum of a maximum relation probability value of the first entity relative to the second entity and a maximum relation probability value of the second entity relative to the first entity.

In an implementation, the obtaining module is configured to:

convert each word in the target sentence into a 1024-dimensional vector, to obtain a vector set; and input the vector set to an entity recognition model, such that the entity recognition model recognizes each first entity in the target sentence.

For the more specific working process of each module and unit in this embodiment, refer to the corresponding content disclosed in the foregoing embodiment. Details are not described herein again.

It might be learned that this embodiment provides the natural language processing apparatus capable of extending effective information for the target sentence that is used as the input data of the BERT model, to improve processing accuracy of the BERT model in the natural language processing task and improve processing efficiency and processing effects of the BERT model.

The following describes an electronic device provided in an embodiment of the present application. Reference may be made between the electronic device described below and the natural language processing method described above.

Figure 5:
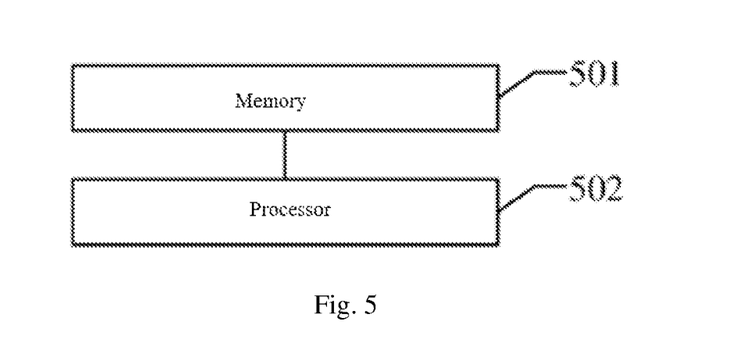
FIG. 5 is a schematic diagram of an electronic device according to one or more embodiments.

As shown in FIG. 5, an embodiment of the present application discloses an electronic device, including:

a memory 501, configured to store computer-readable instructions; and a processor 502, configured to execute the computer-readable instructions, to implement the natural language processing method disclosed in any foregoing embodiment.

An embodiment of the present application provides one or more non-volatile computer-readable storage media storing computer-readable instructions. Reference may be made between the one or more non-volatile computer-readable storage medium storing the computer-readable instructions described below and the natural language processing method and apparatus and the device that are described above.

According to the one or more non-volatile computer-readable storage media storing the computer-readable instructions, when the computer-readable instructions are executed by one or more processors, the one or more processors are enabled to perform the steps of the natural language processing method according to any foregoing embodiment. For specific steps of the method, refer to the corresponding content disclosed in the foregoing embodiment. Details are not described herein again.

Terms "first", "second", "third", "fourth", and the like (if existing) involved in the present application are intended to distinguish between similar objects but do not necessarily indicate a specific order or sequence. It should be understood that data termed in such a way are interchangeable in proper circumstances, so that the embodiments described herein can be implemented in orders other than content illustrated or described herein. In addition, terms "include" and "have" and any variants thereof are intended to cover a non-exclusive inclusion. For example, a process, method, or device that includes a list of steps or units is not necessarily limited to those expressly listed steps or units, but may include other steps or units not expressly listed or inherent to such a process, method, or device.

It should be noted that descriptions involving "first", "second", and the like in the present application are used merely for descriptive purposes, and cannot be understood as indicating or implying relative importance or implicitly indicating the quantity of indicated technical features. Therefore, a feature defined by "first" or "second" may explicitly or implicitly include at least one such feature. In addition, the technical solutions in the embodiments may be combined with each other, provided that they can be implemented by a person of ordinary skill in the art. When a combination of the technical solutions is contradictory or cannot be implemented, it should be considered that such a combination of the technical solutions neither exists, nor falls within the protection scope claimed by the present application.

All embodiments in the present specification are described in a progressive manner. Each embodiment focuses on differences from other embodiments. For the part that is the same or similar between different embodiments, reference may be made between the embodiments.

The steps of the method or algorithm described with reference to the embodiments disclosed in this specification may be directly implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

In this specification, specific examples are used to describe the principle and implementations of the present application. The description of the embodiments is only intended to help understand the method and core idea of the present application, and a person of ordinary skill in the art may make modifications based on the idea of the present application with respect to the specific implementations and the application scope. Therefore, the content of this specification shall not be construed as limitations on the present application.

What is claimed is:

1. A natural language processing method, comprising:
   acquiring a target sentence of a natural language question-answering task to be processed, and identifying each first entity in the target sentence of the natural language question-answering task, wherein the first entity is a noun in the target sentence of the natural language question-answering task;
   for each first entity, in response to the first entity being present in a preset entity set, identifying, in the preset entity set, a second entity in maximum correlation with the first entity, wherein the second entity is a noun in the preset entity set, and the preset entity set is a collection of nouns;
   outputting extended information based on the determined second entity, and generating an updated target sentence by adding the extended information after a location of the first entity in the target sentence of the natural language question-answering task, wherein the updated target sentence of the natural language question-answering task contains the target sentence of the natural language question-answering task and the extended information, wherein the second entity is any entity in the preset entity set other than the first entity; and
   transferring the updated target sentence of the natural language question-answering task to a bidirectional encoder representation from transformer (BERT) model, wherein the BERT model identifies the first entity and the extended information related to the first entity from the updated target sentence of the natural language question-answering task and outputs an optimal answer to the natural language question-answering task;
   wherein the identifying each first entity in the target sentence of the natural language question-answering task comprises:
     converting each word in the target sentence into a 1024-dimensional vector, to obtain a vector set; and
     inputting the vector set to an entity recognition model, such that the entity recognition model recognizes each first entity in the target sentence, the entity recognition model comprises a transformer, and the transformer comprises six multi-head self-attention modules;
   wherein the identifying, in the preset entity set, a second entity of a plurality of second entities in maximum correlation with the first entity comprises:
     taking the first entity as a target object, and identifying a maximum relation probability value of the target object relative to each second entity of the plurality of second entities, to obtain N−1 pieces of maximum relation probability values, wherein N−1 represents a quantity of the plurality of second entities, and N represents a total quantity of entities comprised in the preset entity set, wherein one first entity and one second entity is represented by an M-dimensional vector, the M-dimensional vector includes M relation probability values, a maximum value in the M relation probability values is determined as a maximum relation probability value between the first entity and the second entity, the M-dimensional vector is obtained by a relation between two entities in each entity group by using a relation recognition model;
     identifying a correlation between each second entity of the plurality of second entities and the target sentence, to obtain N−1 pieces of correlations;
     for each second entity of the plurality of second entities, calculating a product of the correlation corresponding to the second entity and the maximum relation probability value corresponding to the second entity, to obtain a correlation score corresponding to the second entity to obtain N−1 pieces of correlation scores; and taking a second entity corresponding to a maximum correlation score of the N−1 pieces of correlation scores as the second entity in maximum correlation with the target object.

2. The method according to claim 1, wherein the identifying a maximum relation probability value of the target object relative to each second entity of the plurality of second entities comprises:
outputting an N×N×M-dimensional tensor for representing a relation and a relation probability value between entities in the preset entity set, wherein M represents a quantity of dimensions of a relation vector between different entities in the preset entity set; and
outputting a knowledge graph based on the N×N×M-dimensional tensor, and querying, in the knowledge graph, the maximum relation probability value of the target object relative to each second entity of the plurality of second entities.

3. The method according to claim 2, wherein the outputting an N×N×M-dimensional tensor for representing a relation and a relation probability value between entities in the preset entity set comprises:
outputting an initial tensor that is all-0 in N×N×M dimensions;
acquiring a sentence library for outputting the preset entity set, traversing each sentence in the sentence library, and using a traversed sentence as a sentence to be recognized;
taking two adjacent entities in the sentence to be recognized as an entity group, to obtain a plurality of entity groups;
recognizing a relation between two entities in each entity group of the plurality of entity groups by using a relation recognition model, to obtain a plurality of M-dimensional relation vectors;
for each M-dimensional relation vector of the plurality of M-dimensional relation vectors, in response to a maximum value in any M-dimensional relation vector of the plurality of M-dimensional relation vectors being greater than a preset threshold, updating an element at a location that corresponds to the maximum value and that is in the initial tensor from 0 to 1, to update the initial tensor; and
traversing a next sentence in the sentence library and continuing to update a current tensor, and after each sentence in the sentence library is traversed, outputting and optimizing a currently obtained tensor to obtain the N×N×M-dimensional tensor.

4. The method according to claim 3, wherein the recognizing a relation between two entities in each entity group of the plurality of entity groups by using a relation recognition model, to obtain a plurality of M-dimensional relation vectors comprises:
for two entities in any entity group of the plurality of entity groups, replacing the two entities in the sentence to be recognized with different identifiers to obtain a replaced sentence, and transferring the replaced sentence to the relation recognition model, such that the relation recognition model outputs an M-dimensional relation vector corresponding to the two entities.

5. The method according to claim 4, wherein the relation recognition model comprises a sub-model of a transformer structure and a relation classification neural network; and
the transferring the replaced sentence to the relation recognition model, such that the relation recognition model outputs an M-dimensional relation vector corresponding to the two entities comprises:
transferring the replaced sentence to the sub-model of the transformer structure, to obtain a feature vector with the identifiers of the two entities; and
transferring the feature vector with the identifiers of the two entities to the relation classification neural network, to obtain the M-dimensional relation vector corresponding to the two entities.

6. The method according to claim 5, wherein the sub-model of the transformer structure comprises 12 pieces of multi-head attention modules.

7. The method according to claim 4, wherein the replacing the two entities in the sentence to be recognized with different identifiers to obtain a replaced sentence, comprises:
for the sentence, after all entities in the sentence are recognized, replacing the two entities which are adjacent in the sentence in sequence.

8. The method according to claim 7, wherein the replacing the two entities which are adjacent in the sentence in sequence, comprises:
replacing all words corresponding to a first position entity of the two entities which are adjacent in the sentence in sequence with α; and
replacing all words corresponding to a second position entity of the two entities which are adjacent in the sentence in sequence with β, to obtain the replaced sentence.

9. The method according to claim 3, wherein the optimizing a currently obtained tensor to obtain the N×N×M-dimensional tensor comprises:
taking the currently obtained tensor as an initial three-dimensional matrix, and decomposing the initial three-dimensional matrix into M N×N-dimensional matrices $X_i$, wherein i=1, 2, . . . , M;
decomposing a d×d×M-dimensional tensor O obtained through initialization into M pieces of d×d-dimensional matrices $O_i$, wherein d represents an adjustable hyper-parameter;
acquiring an N×d-dimensional matrix A through initialization, and calculating optimal A' and M pieces of optimal $O_i'$ based on $X_i = AO_iA^T$ and a gradient descent method;
acquiring a replaced three-dimensional matrix based on the optimal A' and the M pieces of optimal $O_i'$; and
comparing the initial three-dimensional matrix with the replaced three-dimensional matrix bit by bit based on a max function, and reserving a maximum value at each location, to obtain the N×N×M-dimensional tensor.

10. The method according to claim 1, wherein the identifying a correlation between each second entity of the plurality of second entities and the target sentence comprises:
for each second entity of the plurality of second entities, identifying a normalization result of a sum of a correlation degree between each first entity in the target sentence and the second entity as the correlation between the second entity and the target sentence.

11. The method according to claim 10, wherein a correlation degree between any first entity and any second entity is a maximum relation probability value of the first entity relative to the second entity plus a maximum relation probability value of the second entity relative to the first entity.

12. The method according to claim 1, wherein the method further comprises:
in response to the first entity being not in the preset entity set, splicing no extended information for the first entity.

13. An electronic device, comprising:
a memory, configured to store computer-readable instructions; and
a processor, configured to execute the computer-readable instructions, and upon execution of the computer-readable instructions, is configured to:
acquire a target sentence of a natural language question-answering task to be processed, and identify each first entity in the target sentence of the natural language question-answering task, wherein the first entity is a noun in the target sentence of the natural language question-answering task;
for each first entity, in response to the first entity being present in a preset entity set, identify, in the preset entity set, a second entity in maximum correlation with the first entity, wherein the second entity is a noun in the preset entity set, and the preset entity set is a collection of nouns;
output extended information based on the determined second entity, and generate an updated target sentence by adding the extended information after a location of the first entity in the target sentence of the natural language question-answering task, wherein the updated target sentence of the natural language question-answering task contains the target sentence of the natural language question-answering task and the extended information, wherein the second entity is any entity in the preset entity set other than the first entity; and
transfer the updated target sentence of the natural language question-answering task to a bidirectional encoder representation from transformer (BERT) model, wherein the BERT model identifies the first entity and the extended information related to the first entity from the updated target sentence of the natural language question-answering task and outputs an optimal answer to the natural language question-answering task;
wherein to identify each first entity in the target sentence of the natural language question-answering task the processor is configured to:
convert each word in the target sentence into a 1024-dimensional vector, to obtain a vector set; and
input the vector set to an entity recognition model, such that the entity recognition model recognizes each first entity in the target sentence, the entity recognition model comprises a transformer, and the transformer comprises six multi-head self-attention modules;
wherein to identify, in the preset entity set, the second entity of a plurality of second entities in maximum correlation with the first entity the processor is configured to:
take the first entity as a target object, and identify a maximum relation probability value of the target object relative to each second entity of the plurality of second entities, to obtain N−1 pieces of maximum relation probability values, wherein N−1 represents a quantity of the plurality of second entities, and N represents a total quantity of entities comprised in the preset entity set, wherein one first entity and one second entity is represented by an M-dimensional vector, the M-dimensional vector includes M relation probability values, a maximum value in the M relation probability values is determined as a maximum relation probability value between the first entity and the second entity, the M-dimensional vector is obtained by a relation between two entities in each entity group by using a relation recognition model;
identify a correlation between each second entity of the plurality of second entities and the target sentence, to obtain N−1 pieces of correlations;
for each second entity of the plurality of second entities, calculate a product of the correlation corresponding to the second entity and the maximum relation probability value corresponding to the second entity, to obtain a correlation score corresponding to the second entity to obtain N−1 pieces of correlation scores; and
take a second entity corresponding to a maximum correlation score of the N−1 pieces of correlation scores as the second entity in maximum correlation with the target object.

14. The electronic device according to claim 13, wherein the processor, upon execution of the computer-readable instructions, is further configured to:
output an N×N×M-dimensional tensor for representing a relation and a relation probability value between entities in the preset entity set, wherein M represents a quantity of dimensions of a relation vector between different entities in the preset entity set; and
output a knowledge graph based on the N×N×M-dimensional tensor, and querying, in the knowledge graph, the maximum relation probability value of the target object relative to each second entity of the plurality of second entities.

15. A non-transitory computer-readable storage media storing computer-readable instructions, wherein the computer-readable instructions when executed by one or more processors, are configured to cause the one or more processors to:
acquire a target sentence of a natural language question-answering task to be processed, and identify each first entity in the target sentence of the natural language question-answering task, wherein the first entity is a noun in the target sentence of the natural language question-answering task;
for each first entity, in response to the first entity being present in a preset entity set, identify, in the preset entity set, a second entity in maximum correlation with the first entity, wherein the second entity is a noun in the preset entity set, and the preset entity set is a collection of nouns;
output extended information based on the determined second entity, and generate an updated target sentence by adding the extended information after a location of the first entity in the target sentence of the natural language question-answering task, wherein the updated target sentence of the natural language question-answering task contains the target sentence of the natural language question-answering task and the extended information, wherein the second entity is any entity in the preset entity set other than the first entity; and
transfer the updated target sentence of the natural language question-answering task to a bidirectional encoder representation from transformer (BERT) model, wherein the BERT model identifies the first entity and the extended information related to the first entity from the updated target sentence of the natural language question-answering task and outputs an optimal answer to the natural language question-answering task;

wherein to identify each first entity in the target sentence of the natural language question-answering task the computer-readable instructions are configured to cause the one or more processors to:
  convert each word in the target sentence into a 1024-dimensional vector, to obtain a vector set; and
  input the vector set to an entity recognition model, such that the entity recognition model recognizes each first entity in the target sentence, the entity recognition model comprises a transformer, and the transformer comprises six multi-head self-attention modules;

wherein to identify, in the preset entity set, the second entity of a plurality of second entities in maximum correlation with the first entity the computer-readable instructions are configured to cause the one or more processors to:
  take the first entity as a target object, and identify a maximum relation probability value of the target object relative to each second entity of the plurality of second entities, to obtain N−1 pieces of maximum relation probability values, wherein N−1 represents a quantity of the plurality of second entities, and N represents a total quantity of entities comprised in the preset entity set, wherein one first entity and one second entity is represented by an M-dimensional vector, the M-dimensional vector includes M relation probability values, a maximum value in the M relation probability values is determined as a maximum relation probability value between the first entity and the second entity, the M-dimensional vector is obtained by a relation between two entities in each entity group by using a relation recognition model;
  identify a correlation between each second entity of the plurality of second entities and the target sentence, to obtain N−1 pieces of correlations;
  for each second entity of the plurality of second entities, calculate a product of the correlation corresponding to the second entity and the maximum relation probability value corresponding to the second entity, to obtain a correlation score corresponding to the second entity to obtain N−1 pieces of correlation scores; and
  take a second entity corresponding to a maximum correlation score of the N−1 pieces of correlation scores as the second entity in maximum correlation with the target object.

* * * * *